(12) United States Patent
Ritson

(10) Patent No.: US 7,183,936 B2
(45) Date of Patent: Feb. 27, 2007

(54) CLOSURE CAP WITH AUDIBLE WARNING

(76) Inventor: Peter Alvin Ritson, 81A New Ferry Road, New Ferry, Birkenhead, Meryside (GB) CH62 1BH (*) Notice: Subject to any disclaimer, the term of this patent is extended or adjusted under 35 U.S.C. 154(b) by 198 days.

(21) Appl. No.: 10/509,515

(22) PCT Filed: Mar. 28, 2003

(86) PCT No.: PCT/GB03/01393

§ 371 (c)(1),
(2), (4) Date: Sep. 28, 2004

(87) PCT Pub. No.: WO03/082696

PCT Pub. Date: Oct. 9, 2003

(65) Prior Publication Data

US 2005/0110647 A1 May 26, 2005

(30) Foreign Application Priority Data

Mar. 28, 2002 (GB) .................................. 0207290

(51) Int. Cl.
*G08B 21/00* (2006.01)
(52) U.S. Cl. ................ 340/686.1; 340/686.3; 340/693.1; 340/665; 340/309.6
(58) Field of Classification Search ............. 340/686.1, 340/686.3, 693.1, 665, 309.6
See application file for complete search history.

(56) References Cited

U.S. PATENT DOCUMENTS 6,545,594 B1 * 4/2003 Knight et al. ............ 340/384.7

2002/0093427 A1 * 7/2002 Roth ...................... 340/573.1

FOREIGN PATENT DOCUMENTS

| DE | 3501172 | 7/1986 |
|----|---------|--------|
| EP | 0637551 | 2/1995 |
| WO | WO01/89950 | 11/2001 |

* cited by examiner

*Primary Examiner*—Jeffrey Hofsass
*Assistant Examiner*—Hongmin Fan
(74) *Attorney, Agent, or Firm*—Shoemaker and Mattare

(57) ABSTRACT

A closure cap (10) is provided with an audible warning when the cap (10) is removed from a container (12). The closure cap (10) preventing the inadvertent consumption of pharmaceutical products, bleaches or other products by children or other minors. In use, the closure cap (10) may be provided with child resilient means and can be screwed on to any standard container (12). When the cap (10) is removed from the container (12), mechanical energy is expended by the user and such mechanical energy is converted to sufficient electrical energy using a piezoelectrical element (14) contained in the cap (10). The electrical energy generated is then conditioned and stored using signal conditioning electronics (26) such that and alarm signal of sufficient level is sounded. In use, the piezoelectrical element (14) is interposed between two sprung steel sections (16) formed as a dome and the action of unscrewing the cap (10) causes the sprung sections (16) to snap back producing a large dynamic force on said piezoelectrical element (14) which produces a large voltage output.

46 Claims, 4 Drawing Sheets

CLOSURE CAP WITH AUDIBLE WARNING

This Application is a national phase of International Application No. PCT/GB03/01393, filed Mar. 28, 2003, to P. A. Ritson, for Closure Cap with Audible Warning.

The present invention relates to a closure cap with audible warning. In particular, the present invention relates to an apparatus for providing an audible warning when the cap is removed from a container.

The most important aspect when storing any consumable products is that an airtight seal must be made and maintained between the closure cap and the container. A simple technique for indicating the integrity of a seal involves the use of a 'safety button', whereby the container, which is firstly filled with the consumable product, is held at a slightly reduced pressure prior to adding the closure cap. For as long as the seal remains intact, the reduced pressure in the container is sufficient to retain an indent inside the cap. When the cap is removed, the pressure in the container equalises and the indent becomes raised. Whilst these simple devices have proven popular for certain products, they suffer the main disadvantage that they only operate when the cap is initially removed from the container. There is therefore the need for closure cap which provides an alarm condition every time the cap is removed from the container. Such a device could be utilised as an anti-tamper indicator or as part of a child resistant packaging for protecting the inadvertent consumption of pharmaceutical products, bleaches or other products by children or other minors.

In recent years, child resistant containers have become commonplace. Generally, such containers have a closure cap which can only be removed by depressing the mechanism against a resilient locking mechanism. The benefits of these containers are well known, and it is believed that since child resistant packaging of prescription medicines was introduced in the United States in the 1970's, the fatality rate was reduced by up to 45%. However, the accident figures have recently been climbing, due to a large measure to the improved motor skills of young children with sophisticated modern toys.

Analysis of the statistics for child poisoning show that approximately 50% of accidents are due to first or second generation parents leaving prescription medicines or hazardous domestic chemicals, such as bleach, with the caps loose, or off, or in containers without child resistant caps. In the other 50% of accidents, the children simply overcame the mechanism of the child resistant cap. Although many different techniques have been proposed to improve child resistant packaging in recent years, none have been entirely successful and it is difficult to envisage a mechanical solution to this problem, largely due to the fact that the cap, which must defeat a child gaining access, must also be accessible to an elderly person with probably somewhat reduced motor skills.

It is the object of the present invention to provide a closure cap with audible warning. The present invention provides an audible alarm when the seal between a closure cap and a container is broken, and hence may be used as an indicator of the integrity of said seal. The present invention preventing the inadvertent consumption of pharmaceutical products, bleaches or other products by children or other minors, as when the cap is removed from the container an audible warning is sounded so that a responsible adult is alerted to replace the cap in a reasonable time and before an accident occurs. The present invention enabling the secure storage of pharmaceutical products, bleach or other products in a simple and economic package, the physical dimensions of which must be compatible with caps on conventional containers to allow retrofitting if required. It is a further object of the present invention to provide a cap with anti-tamper warning that is self-powered and having low-power electronics to drive an audible warning device when the cap is removed from the container.

According to the present invention there is provided a cap adapted to engage with a container, comprising:

an electrical generation means for converting the mechanical energy expended on removing said cap from said container into electrical energy;

signal conditioning circuitry for conditioning and storing said electrical energy; and a warning means for generating an alarm condition.

In use, said cap is adapted to engage with said container via a screw thread. Preferably, said cap being formed from polypropylene or molded from a suitable plastics material. Further, in use, said cap having physical dimensions compatible with standard containers of pharmaceutical products, bleach or other products. Said cap may also include child resistant measures, such as, for example, a resilient locking mechanism.

In a preferred embodiment, said electrical generation means further comprises a piezoelectric element. Said piezoelectric element being formed from a suitable piezoceramic material or polyvinylidene fluoride film. In one embodiment, said piezoelectric element is interposed between said cap and said container, such that a compressive force acts to compress the full area of said piezoelectric element. Upon removal of said cap, the compressive force on said piezoelectric element is removed and an output voltage is produced which is proportional to the intrinsic properties and physical dimensions of the piezoelectric element.

In order to increase the output voltage produced by said piezoelectric element, the electrical generation means may further comprise a trigger mechanism for producing a dynamic force on said piezoelectric element when the user removes said cap from said container. In use, the piezoelectric element is preferably located between two sprung steel sections and the action of unscrewing the cap causes the sprung steel sections to 'snap' back, producing a large dynamic force on said piezoelectric element. Preferably, said piezoelectric element would initially produce a voltage output due to a compressive force across its thickness direction closely followed by a much larger but additional voltage due to stretch along its length axis as the sprung steel sections 'snap' back. The 'snap' force of the sprung steel sections will be a function of the type of mechanism incorporated in said cap.

In an alternative embodiment, said electrical generation means further comprises an electromechanical generator. In use, a mechanism is provided which gives sufficient motion of a coil linking a fixed magnetic field to produce said electrical energy.

Further preferably, the output voltage generated by said electrical generation means is fed to signal conditioning circuitry which perform the steps of voltage reduction, charge storage, voltage regulation and drive oscillation prior to activating said warning means.

In a preferred embodiment, said warning means further comprises an audible sounder, being located in said cap. For normal adult use, said audible sounder acts as a reminder to replace the cap when the container has been used. When said cap is removed by a child, the audible sounder is sufficiently loud to preferably warn an adult on the premises that the container has been opened. Preferably, a sound pressure level of at least 75 dBA is produced. In one embodiment, said audible sounder, which need only 'bleep' intermittently, should continue until said cap is replaced. However, with limited energy available from a single cap removal, the audible sounder will preferably sound for a finite time, which should be for at least 10 seconds after the cap is removed to allow the user time to access the contents of the container, but sufficient to provide warning of child access. In use, said audible sounder may be provided by an electromagnetic or piezoelectric sounder, although to reduce energy requirements the latter is preferred.

In an alternative embodiment, said warning means may be implemented as a remote system, whereby on removal of said cap from said container an alarm condition is transmitted to a remote receiver and audible sounder. In use, this may be achieved using a uniquely identified radio frequency tag embedded in said cap.

Also according to the present invention there is provided a cap adapted to engage with a container for detecting the relative position between said cap and said container, comprising:

a piezoelectric element for generating an electrical output when said cap is removed from said container; and an audible sounder, being driven by said electrical output of said piezoelectric element.

The advantages of the present invention are that a closure cap with audible warning is provided. The present invention provides an audible alarm when the seal between a closure cap and a container is broken, and hence may be used as an indicator of the integrity of said seal. The present invention preventing the inadvertent consumption of pharmaceutical products, bleaches or other products by children or other minors, as when the cap is removed from the container an audible warning is sounded so that a responsible adult is alerted to replace the cap in a reasonable time and before an accident occurs. The present invention enabling the secure storage of pharmaceutical products, bleach or other products in a simple and economic package, the physical dimensions of which must be compatible with caps on conventional containers to allow retrofitting if required. In use, the cap with anti-tamper warning is self-powered and has low-power electronics to drive an audible warning device when the cap is removed from the container.

It will be obvious to those skilled in the art that variations of the present invention are possible and it is intended that the present invention may be used other than as specifically described herein.

A specific non-limiting embodiment of the invention will be described by way of example and with reference to the accompanying drawings in which.

Figure 4:
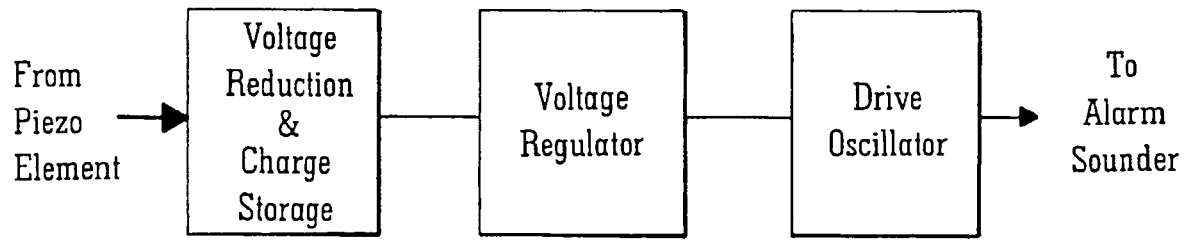

FIG. 4 schematically illustrates further detail of the signal conditioning electronics.

Figure 5:
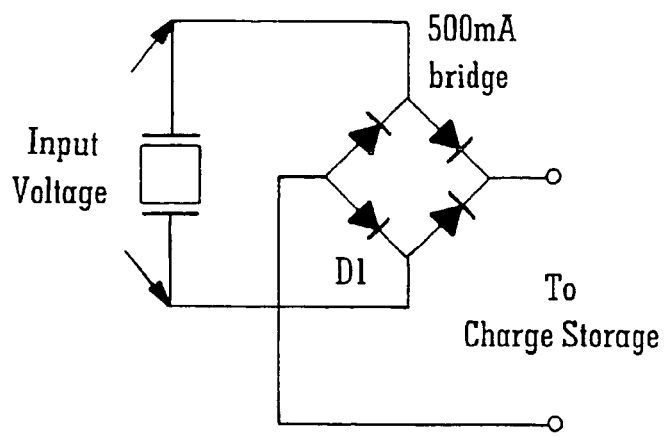

FIG. 5 shows how the voltage obtained from the piezoelectric element is firstly rectified to a suitable DC level.

Figure 6:
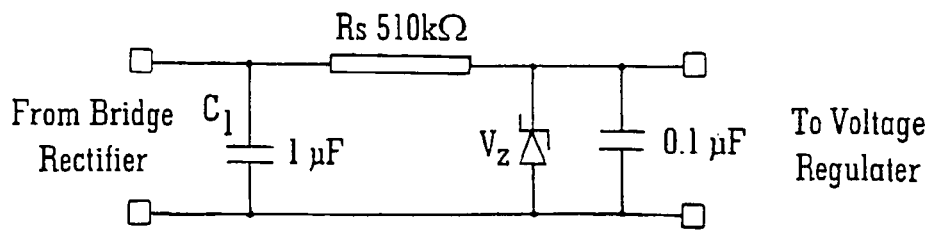

FIG. 6 shows further detail of the charge storage circuit shown in FIG. 4.

Figure 7:
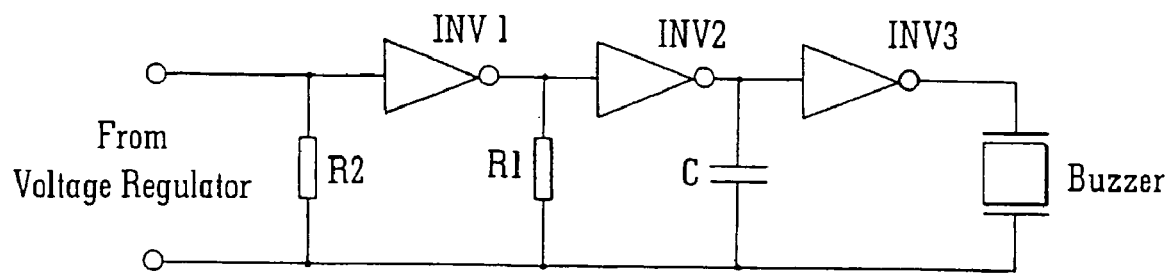

FIG. 7 illustrates a suitable drive oscillator for driving a piezoelectric sounder.

Figure 8:
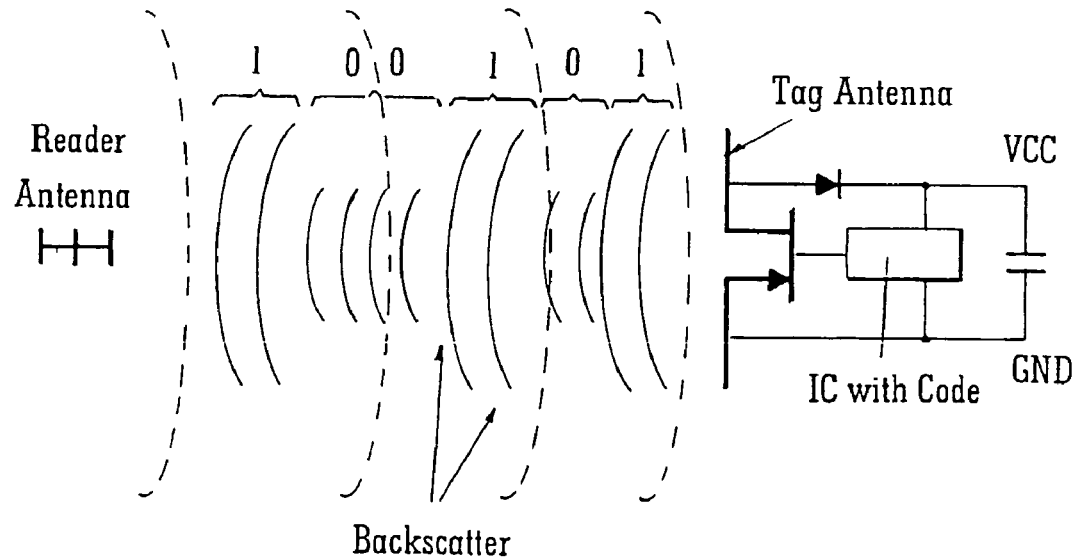

FIG. 8 shows how the present invention may be implemented using a remote alarm sounder.

Figure 1:
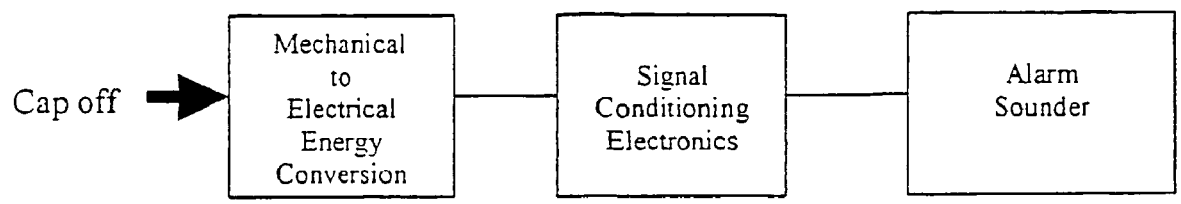
FIG. 1 is a schematic diagram of the present invention.

Referring now to the drawings, wherein the present invention is illustrated schematically in FIG. 1. In use, a cap with anti-tamper warning according to the present invention is screwed on to any standard container capable of storing pharmaceutical products, bleaches or any other products that could be poisonous or otherwise dangerous if inadvertently consumed by children or other minors. When the cap is removed from the container, mechanical energy is expended by the user and, according to the present invention, such mechanical energy is converted to sufficient electrical energy using a piezoelectric element contained in the cap. The electrical energy generated is then conditioned and stored using signal conditioning electronics such that an alarm signal of sufficient level is sounded. In this way, if the cap has been removed by a child or other minor, a responsible adult would be alerted, and could replace the cap in a reasonable time and before an accident occurs.

Figure 2:
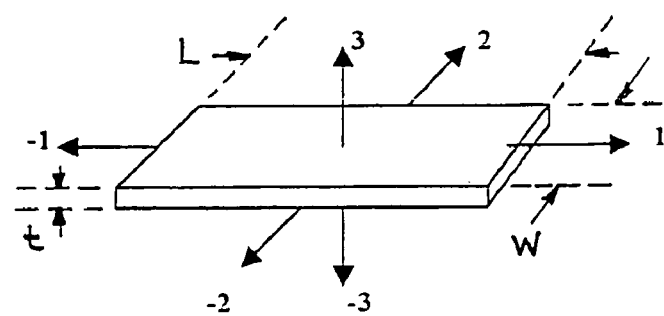
FIG. 2 illustrates how a voltage may be obtained from a piezoelectric element.

FIG. 2 shows schematically how a piezoelectric element can be used to convert mechanical energy into electrical energy. Piezoelectricity is the general term used to describe the property exhibited by certain materials of becoming electrically polarised when stress is applied to them. In a preferred embodiment of the present invention, the piezoelectric element may be implemented using a group of piezoceramics known as PZTs, or alternately an organic PVDF (polyvinylidene fluoride) film or various copolymers.

FIG. 2 shows a piezoelectric element in the form of a plate having length L, Width W and thickness t. The most widely used piezoelectric coefficients, $d_{em}$ and $g_{em}$, for charge and voltage respectively, use subscripts to indicate the electrical (e) and mechanical (m) axes used. Since electrical contacts are normally made the top and bottom of the plate, e is usually axis 3. The mechanical axis is m=1 for stress on the. length axis, or m=3 for stress supplied through the thickness of the element.

By way of example, if a 2 psi (5.6 N) load is applied to the piezoelectric element shown in FIG. 2 having a length and width of 2 cm and a thickness of 1 mm. The force acts to compress the element's thickness ($g_{33}$ mode) across its full area, and the open circuit output voltage $V_{OC}$ for both PZT and PVDF elements is given by $V_{OC}=g_{33} F_3 t/L W$. For a typical PZT element, where $g_{33}=26.5 \times 10^{-3}$, the open circuit output voltage $V_{OC}$ is only 0.37V. For a typical PVDF element, where $g_{33}=339 \times 10^{-3}$, the open circuit output voltage $V_{OC}$ is 4.75V.

From the above analysis, it is clear that the open circuit output voltage produced from a quasi-static force (as would be expected when unscrewing the cap) is probably insufficient to drive an alarm sounder. However, piezoelectric elements are excellent for handling dynamic and transient forces, so to raise the converted electrical energy to a sufficient level it is necessary to include a trigger mechanism into the cap which produces a reasonable dynamic force acting on the piezoeletric element when the cap is removed.

Figure 3:
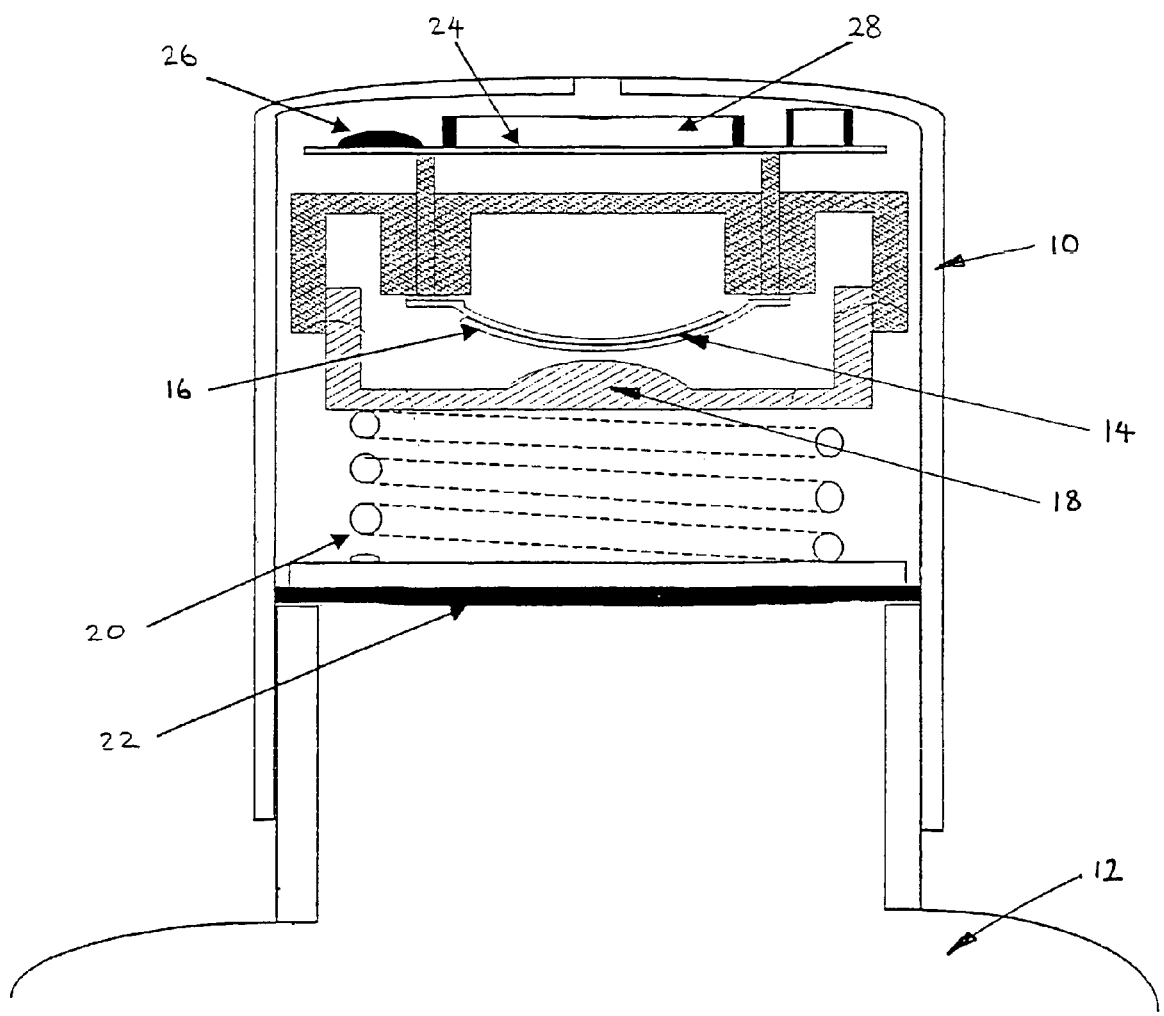
FIG. 3 shows how the cap with anti-tamper warning according to the present invention may be implemented.

FIG. 3 illustrates how this may be implemented in the present invention, and shows a cap 10 according to the present invention which is located on suitable container 12. The contents of the container 12 are sealed from the anti-tamper warning mechanism using wad 22. A piezoelectric element 14 is interposed between two sprung steel sections 16 formed as a dome. As previously mentioned, the piezoelectric element 14 responds best to dynamic input forces rather than static or quasi-static forces, and the piezoelectric element 14 receives a sudden stress when the cap is slowly removed. The piezoelectric element 14 attached to the snap dome 16 would, when activated, produce a high output voltage in excess of 300V.

When in a closed position, a projection or bump 18 deforms the sprung steel sections 16 via spring 20. Since the piezoelectric element 14 is attached to both sprung steel sections 16, the action of unscrewing the cap 10 allows the snap dome 16 to 'snap' back and the piezoelectric element 14 will be stretched along the length axis ($g_{31}$ mode), the forces remaining constant until the cap 10 is restored on the container 12. The force applied and the snap force of the spring will be a function of the type of mechanism incorporated in the cap 12. In use, it is envisaged that the piezoelectric element 14 would initially produce a voltage output due to compression force in the '33' direction closely followed by a much larger but additional voltage due to stretch in the '31' direction as the sprung steel sections 16 'snaps' back. In an alternative embodiment, it is envisaged that the present invention could be implemented with a single spring section 16.

The output of the piezoelectric element 14 is then fed to the signal conditioning electronics 26 located on a surface mount PCB 24 and ultimately to the alarm sounder 28. Further details of this are shown schematically in FIG. 4, with each element of FIG. 4 being dealt with in detail in FIGS. 5, 6 and 7.

Since the voltage generated by the piezoelectric element may be several hundred volts in magnitude, it is necessary to reduce this energy to a suitable value prior to storing such and activating the alarm sounder. FIG. 4 shows the reduction of the potential energy (voltage) of the piezocharges from many hundreds of volts to only a few volts suitable for powering the microcircuitry of CMOS integrated circuits. It requires three circuit functions as shown, and comprises a voltage reduction and charge storage stage; voltage regulation stage; and drive oscillator circuit for the alarm.

The output from the piezoelectric element is bipolar in nature since the element is first compressed and then stretched, as described previously. As such, a bridge rectifier as shown in FIG. 5 will be required. It is important to note that, with larger voltage levels, the peak inverse voltage of the diodes in the bridge must not be exceeded.

The output of the bridge rectifier is then fed to the charge control circuit depicted in FIG. 6, which senses the voltage built up on capacitor $C_1$, and includes a basic Zener diode regulator. Assuming that a 300 nF piezoelectric element capacitance is achievable (depending on the permittivity and physical dimensions of the element), then the voltage developed across the 1 μF capacitor $C_1$ could reach 300V from a 1kV piezoelectric output. The Zener voltage would be chosen within the maximum voltage input for the regulator. Providing the capacitor $C_1$ charges sufficiently quickly (low internal film resistance), this would provide enough current through the regulator to power the CMOS oscillator and alarm sounder for several seconds.

A alternative solution would be to use a switching converter, based on currently available commercial chips, which is a true power converter, and is capable of providing an average DC output current larger than the average DC input current.

In use, the audible sounder used may be provided by an electromagnetic or piezoelectric sounder, although to reduce energy requirements the latter is preferred. FIG. 7 shows a suitable drive oscillator for driving a piezoelectric sounder. The values of C, $R_1$ and $R_2$ are chosen to give a frequency of 1 pulse per second (pps). FIG. 7 shows a driver especially suited for driving a piezoelectric sounder that are used widely in battery driven equipment such as smoke alarms etc. Piezoelectric sounders use the opposite energy transfer to that described for the piezoelectric element. An electrical signal applied across the face of a piezoceramic bender plate element will cause mechanical distortion due to the piezoelectric effect.

When an alternating voltage is applied across the electrodes, the diaphragm alternates bending in the two directions, producing sound waves in air. Typically, the piezoelectric diaphragm does not by itself produce a high sound pressure level (SPL). It is necessary to mount the bender diaphragm in a resonant cavity to enhance the SPL at a specific frequency. Thus in choosing a sounder it is necessary to know its resonant frequency and then design the frequency of the driving oscillator to be as close to that value as possible in order to maximise SPL, and hence volume.

Manufacturers can supply the sounders with the required drive circuit built into the package (self drive) or requiring the user to provide the drive oscillator externally to the package (external drive). The former is preferred, as the internal drive oscillator has a feedback connection from the disc, which allows it to be tuned more closely to the natural frequency of the sounder, giving optimum SPL.

Using external drive circuits, such as the single chip inverter oscillator shown in FIG. 7, the component values must be reasonably stable, and the power supply to the CMOS inverters must also be well regulated, in order to maintain the natural resonant frequency of the cavity and give the best output SPL. In FIG. 7, inverters 1 and 2 form an astable oscillator while Inverter 3 acts as a buffer to shape the waveform. The equation for the frequency of oscillation $f_{ocs}$ is given by $f_{ocs} = 1/2.2 R_1 C$, where $R_2 \cong 10 R_1$.

FIG. 8 shows an alterative embodiment of the present invention, whereby the alarm sounder located inside the cap is replaced by a remote alarm system, since the major problems in designing a self-powered alarm for the cap is that the alarm circuit requires reasonable energy to drive it. An alternative system would be to mount the alarm remotely and cause the cap to signal its state to the alarm circuit.

FIG. 8 shows that a radio frequency identification tag (RFID) could implemented inside the cap, and which could transmit an alarm condition (via an identification code) to a central receiver. In use, passive tags may be used, which are powered continuously from the receiver, which transmits a strong RF signal. This signal is received by the tag antenna, powering the microcircuits which contain the identification code and causing a backscatter signal modulated by the code data. This data is received, decoded and stored by the receiver unit.

These tags are very small and could easily be inserted under the wad sealer in the cap. Additionally, it is also envisaged that the container itself could be tagged so that the removal of the container to anywhere outside the transmit/receive distance would activate the alarm.

Various alterations and modifications may be made to the present invention without departing from the scope of the invention. For example, although particular embodiments refer to providing an audible warning so that the inadvertent consumption of pharmaceutical products, bleaches or other products by children or other minors is prevented, this is in no way intended to be limiting as, in use, the present invention may be implemented so that the audible sounder acts simply as a reminder to replace the cap when the container has been used. The present invention, which provides an audible alarm when the seal between a closure cap and a container is broken, may be used with any consumable products to warn any person that the integrity of the seal is questionable.

The invention claimed is:

1. A cap adapted to engage with a container, comprising:
   an electrical generation means for converting mechanical energy expended on removing said cap from the container into electrical energy;

signal conditioning circuitry for conditioning and storing the electrical energy; and a warning means for generating an alarm condition upon cap removal.

2. A cap as claimed in claim 1, wherein said electrical generation means comprises a piezoelectric element.

3. A cap as claimed in claim 1, wherein said signal conditioning circuitry comprises a voltage reduction and charge storage stage, a voltage regulation stage and a drive oscillation stage.

4. A cap as claimed in claim 3, wherein said voltage reduction and charge storage stage comprises a bridge rectifier.

5. A cap as claimed in claim 3, wherein said voltage regulation stage comprises a capacitor and Zener diode regulator.

6. A cap as claimed in claim 3, wherein said drive oscillation stage comprises a single chip inverter oscillator which is tuned to a natural frequency of said warning means.

7. A cap as claimed in claim 1, wherein said warning means comprises an audible sounder.

8. A cap as claimed in claim 1, wherein said warning means comprises a remote alarm system, whereby on removal of said cap from the container the alarm condition is transmitted to a central receiver and an audible sounder.

9. A cap as claimed in claim 8, wherein said remote alarm system further comprises a uniquely identified radio frequency tag embedded in said cap which transmits the alarm condition via an identification code to said central receiver.

10. A cap as claimed in claim 9, wherein said uniquely identified radio frequency tag is a passive tag which is powered continuously by said central receiver.

11. A cap as claimed in claim 1, wherein said electrical generation means comprises an electromechanical generator.

12. A cap as claimed in claim 11, wherein said electromechanical generator comprises a coil linking a fixed magnetic field to produce the electrical energy.

13. A cap adapted to engage with a container for detecting a relative position between said cap and the container, comprising:

a piezoelectric element for generating an electrical output when said cap is removed from the container; and an audible sounder, being driven by the electrical output of said piezoelectric element.

14. A cap as claimed in claim 1, wherein said cap is adapted to engage with said container via a screw thread.

15. A cap as claimed in claim 1, wherein said cap is formed from polypropylene or molded from a suitable plastics material.

16. A cap as claimed in claim 1, wherein said cap has physical dimensions compatible with standard containers of pharmaceutical products, bleach or other products.

17. A cap as claimed in claim 1, further comprising child resistant measures, such as a resilient locking mechanism.

18. A cap as claimed in claim 2, wherein said piezoelectric element is formed from a suitable piezoceramic material or polyvinylidene fluoride film.

19. A cap as claimed in claim 18, wherein said piezoelectric element is interposed between said cap and the container, such that a compressive force compresses a full area of said piezoelectric element.

20. A cap as claimed in claim 19, wherein upon removal of said cap, the compressive force on said piezoelectric element is removed and an output voltage is produced which is proportional to intrinsic properties and physical dimensions of said piezoelectric element.

21. A cap as claimed in claim 2, wherein said electrical generation means further comprises a trigger mechanism for producing a dynamic force on said piezoelectric element upon removal of said cap.

22. A cap as claimed in claim 21, wherein said trigger mechanism comprises two spring steel sections formed substantially as a dome.

23. A cap as claimed in claim 22, wherein said piezoelectric element is located between said two spring steel sections and unscrewing said cap causes said spring steel sections to 'snap' back, producing a large dynamic force on said piezoelectric element.

24. A cap as claimed in claim 23, wherein said piezoelectric element initially produces a large voltage output due to a compressive force across a thickness direction thereof closely followed by a much larger, but additional voltage due to stretch along a lengthwise axis thereof as said spring steel sections 'snap' back.

25. A cap as claimed in claims 7, wherein said audible sounder produces a sound pressure level to alert a user that said cap has been removed.

26. A cap as claimed in claim 25, wherein the sound pressure level of at least 75 dBA is produced upon removal of said cap.

27. A cap as claimed in claim 25, wherein said audible sounder bleeps intermittently and continues until said cap is replaced.

28. A cap as claimed in claim 25, wherein said audible sounder comprises an electromagnetic or piezoelectric sounder.

29. A cap as claimed in claim 25, wherein said audible sounder indicates an integrity of a seal between said cap and said container.

30. Cap and container system comprising:

a cap as claimed in claim 8; and a container that is tagged so that removal of the container to anywhere outside of a footprint of said central receiver activates an alarm condition.

31. A cap as claimed in claim 13, wherein said cap is adapted to engage with said container via a screw thread.

32. A cap as claimed in claim 13, wherein said cap is formed from polypropylene or molded from a suitable plastics material.

33. A cap as claimed in claim 13, wherein said cap has physical dimensions compatible with standard containers of pharmaceutical products, bleach or other products.

34. A cap as claimed in claim 13, further comprising child resistant measures, such as a resilient lacking mechanism.

35. A cap as claimed in claim 13, wherein said piezoelectric element is formed from a suitable piezoceramic material or polyvinylidene fluoride film.

36. A cap as claimed in claim 35, wherein said piezoelectric element is interposed between said cap and the container, such that a compressive force compresses a full area of said piezoelectric element.

37. A cap as claimed in claim 36, wherein, upon removal of said cap, the compressive force on said piezoelectric element is removed and an output voltage is produced which is proportional to intrinsic properties and physical dimensions of said piezoelectric element.

38. A cap as claimed in claim 13, wherein said electrical generation means comprises a trigger mechanism for producing a dynamic force on said piezoelectric element upon removal of said cap.

39. A cap as claimed in claim 38, wherein said trigger mechanism comprises two spring steel sections formed substantially as a dome.

40. A cap as claimed in claim 39, wherein said piezoelectric element is located between said two spring steel sections and unscrewing said cap causes said spring steel sections to 'snap' back, producing a large dynamic force on said piezoelectric element.

41. A cap as claimed in claim 40, wherein said piezoelectric element initially produces a large voltage output due to a compressive force across a thickness direction thereof closely followed by a much larger, but additional voltage due to stretch along a lengthwise axis thereof as said spring steel sections 'snap' back.

42. A cap as claimed in claim 13, wherein said audible sounder produces a sound pressure level to alert a user that said cap has been removed.

43. A cap as claimed in claim 42, wherein the sound pressure level of at least 75 dBA is produced upon removal of said cap.

44. A cap as claimed in claim 42, wherein said audible sounder bleeps intermittently and continues until said cap is replaced.

45. A cap as claimed in claim 42, wherein said audible sounder comprises an electromagnetic or piezoelectric sounder.

46. A cap as claimed in claim 42, wherein said audible sounder indicates an integrity of a seal between said cap and the container.

* * * * *